Feb. 18, 1947.  A. M. BUEHLER  2,415,934
SUSPENDING MEANS FOR HOPPERS
Filed May 5, 1945   2 Sheets-Sheet 1

INVENTOR
ALLAN M. BUEHLER
By Fetherstonhaugh & Co.
ATTORNEYS.

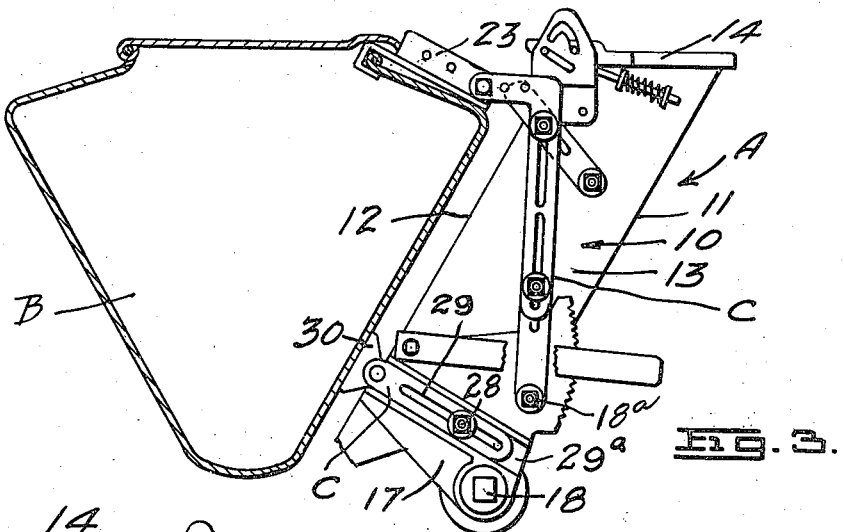
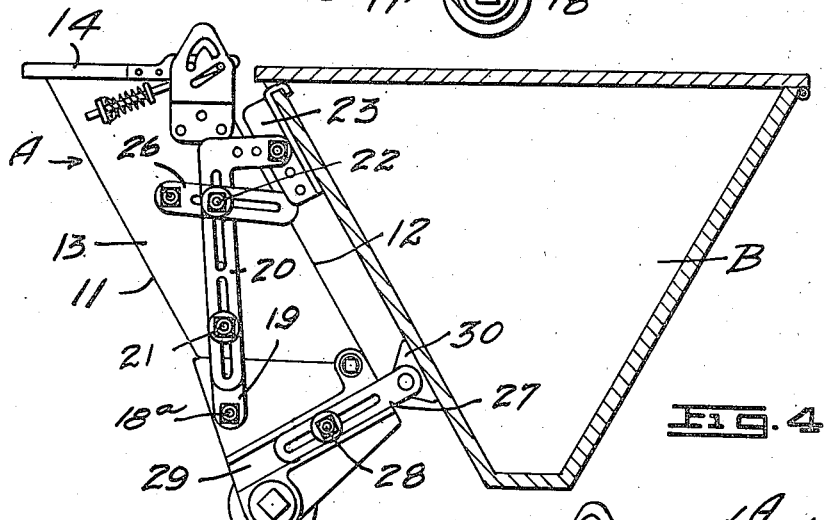
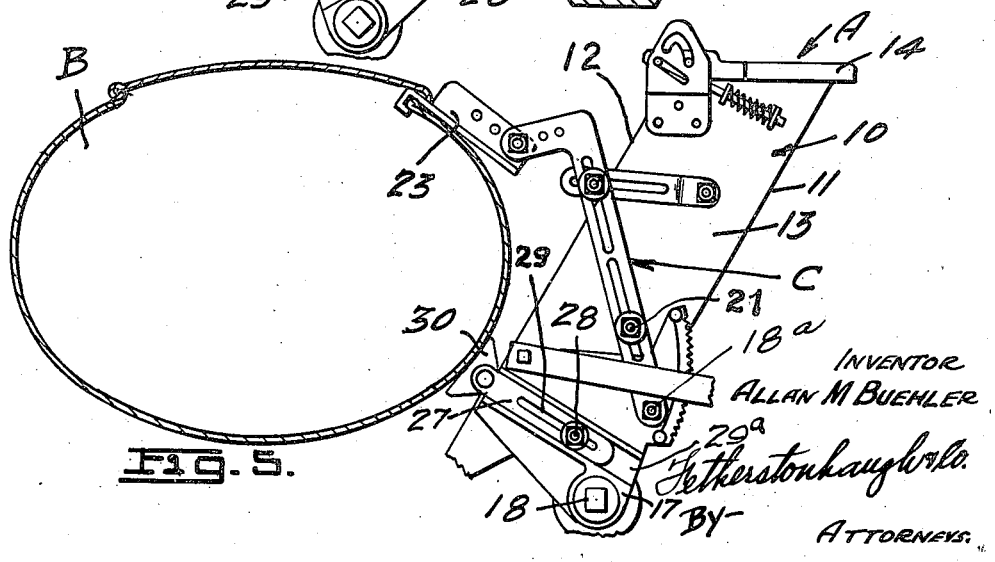

Patented Feb. 18, 1947

2,415,934

UNITED STATES PATENT OFFICE 2,415,934

SUSPENDING MEANS FOR HOPPERS

Allan Moyer Buehler, Preston, Ontario, Canada, assignor to Eastern Steel Products Limited, Preston, Ontario, Canada, a company of Canada Application May 5, 1945, Serial No. 592,252

12 Claims. (Cl. 111—1)

1

This invention relates to suspending means for hoppers and particularly a means of suspending auxiliary hoppers from the hoppers of seeding machines for the purpose of sowing fertilizer, seed or the like.

It has been the practice in the sowing of fertilizer to secure auxiliary hoppers on the seed hoppers of seeding machines in order to discharge the fertilizer through the seed tubes into the furrows as the seed is sown. However, substantial difficulty presents itself because of the varying design of seed hoppers of various makes of seeding machines and consequently it would be necessary either to build onto the hopper of the seeding machine or build up the auxiliary hopper with attachments in order that the auxiliary hopper might finally be mounted. This, however, cannot usually be done in a practical manner. It has been the practice usually to provide special auxiliary hoppers to suit special types of seeding machine hopper. Accordingly, therefore, it is usually necessary for the user to buy a special type of auxiliary hopper to suit the machine in his possession. The special type required, however, may not be readily available so that a further and often serious disadvantage of the practice thus arises.

These disadvantages are completely avoided by the present invention.

It is, therefore, an object of the present invention to provide a special suspending means for auxiliary hoppers whereby the hopper may be adapted for attachment to any design of seed machine hopper or other mounting to which the auxiliary hopper may apply.

A further object of the invention is to provide a device of this kind which employs a particularly simple suspending combination which may be adjusted to form a predetermined, stable, cooperating suspension unit.

A still further object of the invention is to provide a suspension means of this kind which by reason of its simplicity can be manufactured readily and at a comparatively low cost.

With these and other objects in view the invention generally comprises an auxiliary hopper having a pair of suspension members each pivotally attached from one end on opposite sides of the auxiliary hopper at a point intermediate the upper and lower ends of the latter, a cooperating member pivotally attached from one of its ends to the same walls of the hopper at a point intermediate the top of the hopper and the points of pivotal connection of the suspension members including a means of adjustably connecting

2 the suspension member and the said cooperating member to dispose the suspension member at an angle to the hopper, the opposite ends of said suspension members including a securing means disposed to project beyond the body in any angular adjusted position of said suspension members for suspending said auxiliary hopper from the upper portion of the seeding machine hopper or other suitable mounting.

The invention will be clearly understood by reference to the following detailed specification taken in conjunction with the accompanying drawings.

In the drawings,

Figures 3, 4 and 5 are schematic views of hoppers of varying design for seeding machines showing the manner in which the auxiliary hopper of the present invention cooperates therewith when mounted thereon.

Figure 1:
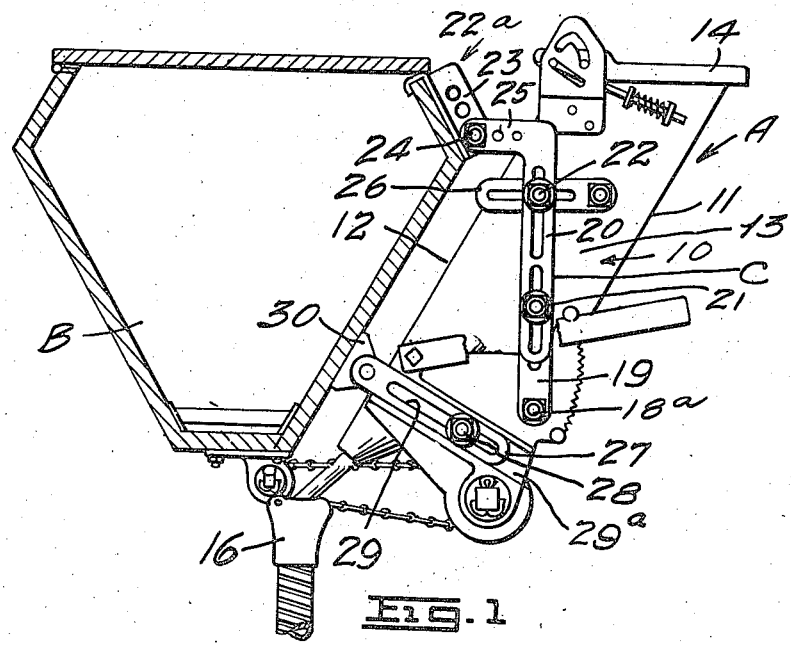
Figure 1 is a side elevation of the auxiliary hopper mounted in position on the seed hopper of a seeding machine, the hopper of the seeding machine being shown in section.
Figure 2:
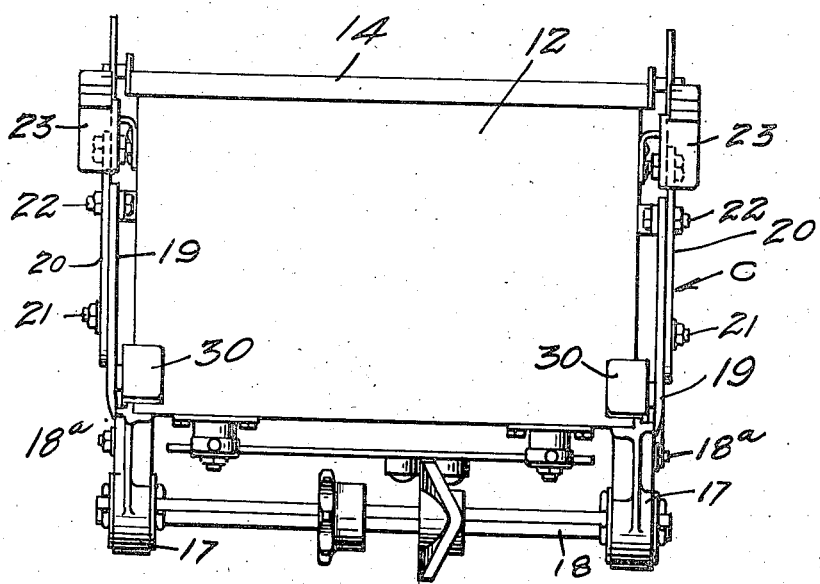
Figure 2 is a rear elevation of the auxiliary hopper.

Referring to the drawings, A indicates an auxiliary hopper which is designed to be suspended from a suitable mounting such as the seed hopper of a seeding machine. This hopper includes a body 10 having front and rear walls 11 and 12 and side walls 13 forming a generally rectangular construction. It may, however, take other convenient forms.

The body 10 is normally closed by a cover 14 suitably hinged if desired. It also includes a discharge tube or tubes for discharging through the lower end thereof fertilizer or other material which it is required to sow. Accordingly, it is conveniently adapted for attachment to the seed box of a seeding machine so that its discharge tubes may be caused to discharge into the seed tubes 16 connected with the hopper B of a suitable seeding machine.

Preferably the auxiliary hopper is provided with the lower bracket members 17 in the form of castings which are designed to mount the agitating shaft 18 for the auxiliary hopper for the discharge of the material carried within the latter. This mechanism is not shown in detail and forms part of a copending application. Preferably mounted on the brackets 17 or otherwise suitably attached to opposite walls of the auxiliary hopper is a suspending element C which at its lower end is pivoted as at 18ª. This suspending member is preferably formed in two sections 19 and 20 each of which is longitudinally slotted to permit the passage of the bolts 21 and 22 to permit longitudinal adjustment of the sections relatively to one another whereby to lengthen or shorten the member. The free end of the member C or otherwise the end of section 20 is provided with a securing member in the form of a hooklike element 22ª preferably flanged as at 23 and pivotally connected to the end of section 20 by a suitable bolt 24. In this connection the end of section 20 is offset to provide the angularly disposed arm 25 which is orificed at spaced apart points while the flange 23 is also orificed at spaced apart points so that the hooklike element 22ª may be laterally adjusted along the length of the arm 25.

Cooperating members 26 are pivotally attached from one end to the opposite side walls 13 of the hopper and are pivotally attached to the suspension member preferably by slotting the members 26 and forming an adjustable connection by means of the bolts 22 so that the suspension elements C may be angularly adjusted relatively to the axis of the side walls along the length of the pivotal members 26 and secured in a rigid adjusted position.

Preferably I provide adjustable laterally projecting supports 27 secured by bolts 28 which pass through the slot 29 in these supports entering the brackets 17. These brackets also preferably include ribs or the like to form a guideway 29ª so that the supports 27 may slide laterally to the selected adjusted position and will be rigidly maintained in this said position when the bolts 28 are secured. On the free end of the supports 27 pivotally attached shoes 30 are preferably included so that they will bear against the wall of the seeding machine hopper and will automatically accommodate the angle of this wall for the lower end bearing support of the auxiliary hopper therefrom.

This suspension unit adapts the auxiliary hopper to mounting on any of the varying types of seed machine hoppers in a practical manner such as to provide a rigid support which may be set in substantially quick order by means of a wrench or the like. For instance, when considering the type of hopper shown in Fig. 1, the hooklike element 23 is extended by connecting it with the outermost orifice in the arm so that the hooklike member lies along the sloped upper ledge of the hopper, with the suspending member vertically extending and the adjustable foot engaging the lower portion of the hopper wall, the auxiliary hopper is disposed in spaced parallel relation to the latter in a position practicable to discharge the material contained therein to the feed tubes of the machine.

In Fig. 3, its adaptability to mounting on a different construction of hopper is readily illustrated wherein the hooklike members of the structure lie substantially horizontally along the upper ledge of the hopper with the remaining parts substantially in similar location to the disclosure in Fig. 1.

In Figs. 4 and 5, its adaptability to other forms of hopper construction is aptly illustrated. In Fig. 4, the hooklike member is attached to the suspension member intermediate the end of the former, while the other parts of the suspending combinations are disposed in readily adapted positions to mount the structure in proper manner. A substantial variation in the location of the parts to suit the hopper construction in Fig. 5 illustrates the wide variation of adjustment which the development provides while mounting the auxiliary hopper in the desired position.

From the foregoing, it will be clearly apparent that I have provided a simple and practical suspending means for hoppers and the like which may be adapted to varying types of construction with equal facility. It is of course apparent that some changes may be made in the construction without departing from the spirit of the invention and the scope of the appended claims.

What I claim as my invention is:

1. An adjustable means for mounting hoppers comprising a hopper body, a suspension member mounted on opposite sides of said body and pivotally connected thereto at one end of each suspension member and at a point on the body intermediate its top and bottom, a cooperating member mounted on each of said sides of the body pivotally connected thereto at one end of each of said cooperating members and at a point on the body intermediate its top and said points of pivotal connection of said suspension members, means for adjustably connecting each adjacent adjustable suspension member and cooperating member to dispose the suspension member angularly relatively to the body, securing means in connection with the opposite ends of said suspension members located to project beyond the body in any angular adjusted position of said suspension members, said securing means designed for securing said suspension members to a mounting to suspend said body therefrom.

2. An adjustable means for mounting hoppers as claimed in claim 1 in which the securing means comprises securing elements pivotally secured to said opposite ends of said suspension members.

3. An adjustable means for mounting hoppers as claimed in claim 1 in which the suspension members are formed in two sections and adjustably connected to lengthen or shorten said members as required.

4. An adjustable means for mounting hoppers as claimed in claim 1 in which the suspension members are formed in two sections, each section being longitudinally slotted and bolt means for connecting said sections in a selected longitudinally adjusted relation to one another, said cooperating member being slotted and adjustably connected with said suspension member by the said bolt means whereby to provide for the longitudinal adjustment of the suspension member and angular adjustment of the suspension member in a selected rigidly set position.

5. An adjustable means for mounting hoppers as claimed in claim 1 in which the lower end of the body is provided with a support designed to project from the body to form a bearing support cooperating with said suspension members in the mounting of said body.

6. An adjustable means for mounting hoppers as claimed in claim 1 in which the lower end of the body is provided with a support designed to project from the body to form a bearing support cooperating with said suspension members in the mounting of said body, said bearing support being laterally adjustable whereby to space the lower portion of said body from an adjacent surface to a predetermined degree.

7. An adjustable means for mounting hoppers comprising a hopper body, a suspension member mounted on opposite sides of said body and pivotally connected thereto at one end of each suspension member and at a point on the body intermediate its top and bottom, a cooperating member mounted on each of said sides of the body pivotally connected thereto at one end of each of said cooperating members and at a point on the body intermediate its top and said points of pivotal connection of said suspension members, means for adjustably connecting each adjacent adjustable suspension member and cooperating member to dispose the suspension member angularly relatively to the body, a securing element pivotally connected to the opposite end of each of said suspension members and angularly adjustable relatively thereto and designed to project beyond the body in any angular adjusted position of said suspension members, said securing members being designed for securing said suspension members to a mounting to suspend said body therefrom and bearing support means carried by the lower end of said body for engaging an adjacent surface to set, in combination with said suspension members, the angular position of said body relatively to the mounting and means for laterally adjusting said bearing support means.

8. An adjustable means for mounting hoppers comprising a hopper body, a suspension member mounted on opposite sides of said body and pivotally connected thereto at one end of each suspension member and at a point on the body intermediate its top and bottom, a cooperating member mounted on each of said sides of the body pivotally connected thereto at one end of each of said cooperating members and at a point on the body intermediate its top and said points of pivotal connection of said suspension members, means for adjustably connecting each adjacent adjustable suspension member and cooperating member to dispose the suspension member angularly relatively to the body, hooklike elements pivotally connected to the opposite ends of said suspension members, means for adjusting said hooklike elements laterally of said suspension members, said hooklike elements being designed to project beyond the body in any angular adjusted position of said suspension members and for securing said suspension members to a mounting to suspend the body therefrom.

9. An adjustable means for mounting hoppers as claimed in claim 8 in which the means of laterally adjusting the hooklike elements include an arm angularly projecting from the opposite ends of said suspension members and means for securing said hooklike elements at various locations along the length of said arms.

10. An adjustable means for mounting hoppers comprising a hopper body, a suspension member mounted on opposite sides of said body and pivotally connected thereto at one end of each suspension member and at a point on the body intermediate its top and bottom, a cooperating member mounted on each of said sides of the body pivotally connected thereto at one end of said cooperating members and at a point on the body intermediate its top and said points of pivotal connection of said suspension members, means for adjustably connecting each adjacent adjustable suspension member and cooperating member to dispose the suspension member angularly relatively to the body, securing means in connection with the opposite ends of said suspension members located to project beyond the body in any angular adjusted position of said suspension members, said securing means designed for securing said suspension members to a mounting to suspend said body therefrom, bearing support means carried by the lower portion of said body and designed to project therebeyond to engage an adjacent surface to cooperate with said suspension members in positioning said body in predetermined set position relatively to the mounting, guideways in connection with said body for receiving parts of said bearing support means and means for adjustably connecting said bearing support means in said guideways for lateral adjustment.

11. An adjustable means for mounting hoppers comprising a hopper body, a suspension member mounted on opposite sides of said body and pivotally connected thereto at one end of each suspension member and at a point on the body intermediate its top and bottom, a cooperating member mounted on each of said sides of the body pivotally connected thereto at one end of each of said cooperating members and at a point on the body intermediate its top and said points of pivotal connection of said suspension members, means for adjustably connecting each adjacent adjustable suspension member and cooperating member to dispose the suspension member angularly relatively to the body, securing means in connection with the opposite ends of said suspension members located to project beyond the body in any angular adjusted position of said suspension members, said securing means designed for securing said suspension members to a mounting to suspend said body therefrom, a supporting member carried on each of said opposite sides of said body and designed to project therefrom, said support members including a bearing shoe pivotally connected to the projecting ends thereof and designed to engage an adjacent surface to support the lower end of said body in spaced relation thereto.

12. An adjustable means for mounting hoppers as claimed in claim 11 in which the body is provided with a side bracket disposed adjacent its base on each of said opposite sides thereof, each of said brackets being designed to mount one of said supporting members and means for adjustably mounting said supporting members for varying the degree of projection of said supporting members relatively to the body.

ALLAN MOYER BUEHLER.